(12) United States Patent
Kleinrouweler et al.

(10) Patent No.: US 12,063,271 B2
(45) Date of Patent: Aug. 13, 2024

(54) MIGRATION OF REMOTE DATA PROCESSING BETWEEN SERVERS

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Jan Willem Martin Kleinrouweler, Pijnacker (NL); Toni Dimitrovski, Boskoop (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 18/255,071

(22) PCT Filed: Nov. 30, 2021

(86) PCT No.: PCT/EP2021/083537
§ 371 (c)(1),
(2) Date: May 30, 2023

(87) PCT Pub. No.: WO2022/117550
PCT Pub. Date: Jun. 9, 2022

(65) Prior Publication Data
US 2024/0098142 A1    Mar. 21, 2024

(30) Foreign Application Priority Data
Dec. 3, 2020  (EP) .................................... 20211429

(51) Int. Cl.
*H04L 67/1095* (2022.01)
*H04L 67/563* (2022.01)

(52) U.S. Cl.
CPC ........ *H04L 67/1095* (2013.01); *H04L 67/563* (2022.05)

(58) Field of Classification Search
None
See application file for complete search history.

(56) References Cited

U.S. PATENT DOCUMENTS

| 7,987,003 | B2 * | 7/2011 | Hoffberg | .............. | G05B 19/042 |
| | | | | | 370/200 |
| 2006/0136570 | A1 * | 6/2006 | Pandya | ................. | H04L 69/161 |
| | | | | | 709/217 |

(Continued)

OTHER PUBLICATIONS wang et al., "Transparent flow migration for NFV", Nov. 1, 2016, IEEE, 2016 IEEE 24th International Conference on Network Protocols (ICNP) (pp. 1-10) (Year: 2016).*

(Continued)

*Primary Examiner* — Davoud A Zand
(74) *Attorney, Agent, or Firm* — Hamilton, Brook, Smith & Reynolds, P.C.

(57) ABSTRACT

A gateway system is described for use as a gateway between a client device and a remote server. The client device may stream a data stream via the gateway system to the remote server for remote processing. The gateway system may receive the data stream and markers which identify respective blocks of packets in the data stream, wherein each identified block of packets is independently processable. In response to an instruction or configuration to effect a migration of the remote processing from the remote server to a further remote server, the gateway system may determine a block of packets in the data stream from which block of packets onwards the further remote server is to start processing the data stream so as to effect or initialize the migration, and when received, stream the determined block (Continued)

of packets and subsequent blocks of packets of the data stream to the further remote server.

22 Claims, 7 Drawing Sheets

(56) References Cited

U.S. PATENT DOCUMENTS

2007/0169179 A1* 7/2007 Narad ................ G06F 9/30036
712/E9.02
2020/0153752 A1 5/2020 Chan et al.

OTHER PUBLICATIONS

PCT International Search Report for application No. PCT/EP2021/083537 filed Nov. 30, 2021.
PCT Written Opinion of the International Searching Authority for application No. PCT/EP2021/083537 filed Nov. 30, 2021.
European Search Report for European Patent Application No. EP20211429 dated May 18, 2021.
"MEC in 5G networks," ETSI White Paper No. 28, First edition, Jun. 2018, 28 pages.
Govindaraj, K., "Investigation of Uninterrupted Service Live Migration Using Software-Defined Networking", 2019 International Conference on Networked Systems (NetSys), Oct. 3, 2019, pp. 1-6.
Govindaraj, K., et al., "Container Live Migration for Latency Critical Industrial Applications on Edge Computing", 2018 IEEE 23rd International Conference on Emerging Technologies and Factory Automation (ETFA), vol. 1, Oct. 25, 2018, pp. 83-90.

* cited by examiner

MIGRATION OF REMOTE DATA PROCESSING BETWEEN SERVERS

This application is the U.S. National Stage of International Application No PCT/EP2021/083537, filed Nov. 30, 2021, which designates the U.S., published in English, and claims priority under 35 U.S.C. § 119 or 365(c) to European Application No. 20211429.4, filed Dec. 3, 2020. The entire teachings of the above applications are incorporated herein by reference.

TECHNICAL FIELD

The invention relates to remote processing of a data stream of a client device by a remote server, such as a cloud server or an edge node in a telecommunication network. The invention further relates to the migration of the remote processing from the remote server to another remote server. The invention further relates to a gateway system for use as a gateway between the client device and the remote server, and to a computer-implemented method for providing a corresponding gateway function. The invention further relates to the client device and a corresponding computer-implemented method, to the remote server and a corresponding computer-implemented method, and to an orchestration system and computer-implemented method for orchestrating the migration of the remote processing. The invention further relates to a computer-readable medium comprising a computer program, and to a computer-readable medium comprising packets of the data stream.

BACKGROUND

Multi-access Edge Computing (MEC) [1], or in short edge computing, is a computing paradigm where compute nodes may be located relatively close to a client device, for example at an edge of a mobile network. Such compute nodes may therefore also be referred to as edge nodes, and their location may enable high-bandwidth and low-latency connectivity between the client devices and edge nodes. Edge computing may therefore be seen as enabler for applications with high demands for computing and bandwidth resources, including real-time data processing and high-definition Extended (e.g., Augmented or Virtual) Reality streaming applications.

A typical edge computing use case may be one where a client device may send a continuous high-bandwidth data stream to an edge node, with the edge node processing the data stream to obtain an output, e.g., an analysis result, and then transmitting the output to a cloud server or other receiving entity. For example, a lightly compressed high-definition video stream may be uploaded to an edge node; the edge node may then analyze the video stream to extract metadata tags from the video stream and forward the metadata tags to the cloud server or other receiving entity, potentially along with a heavily compressed version of the video stream to impose lighter networking requirements on the backhaul network upstream of the edge node.

Despite the location of edge nodes near client devices typically being a major advantage from a performance perspective, it may occur that edge processing functions for a specific application may need to be migrated to another edge node. For example, edge migrations may be triggered due to client mobility (e.g., another edge node may offer better connectivity to the client device) or for resource optimizations by an edge provider (e.g., heavily loaded edge nodes may be relieved by moving part of the processing to another edge node, or the processing on multiple lightly loaded edge nodes may be merged onto a single node). Migrations may occur between edge clusters at physically different locations or between servers within a cluster.

However, applications that rely on a data stream being continuously streamed from a client device to an edge node may suffer from interruptions in processing when a migration between edge nodes is performed. Such interruptions in the processing may also be undesirable in other situations in which a remote server other than an edge node processes a data stream of a client device, for example in cloud computing in which a data stream of a client device may be processed by one or more cloud servers. Such servers and their processing may in the following also simply be referred to as remote servers and remote processing, and include the afore-mentioned edge processing by edge nodes and cloud processing by cloud servers.

It may be desirable to enable a more seamless migration between edge nodes, or in general between remote servers processing a client device's data stream.

Govindaraj et al. describe in [2] a redundancy migration scheme. It is said that from the time instance when the migration is triggered, the client transmits packet streams to the destination server. The destination server buffers these packets and forwards the same to the source server. Meanwhile, the source server starts to iteratively transmit files and a checkpoint relevant to the service to be migrated to the destination service while the service continues to run on the source server. The destination server restores the checkpoint provided by the source server. Once the service is up and running, the destination server starts to replay all the buffered packets, which involves replaying the packets exactly from the checkpoint to catch up to the state of the source server. Once caught-up, the outputs of both servers are compared and if the same, the destination server is declared to be ready to take over.

Disadvantageously, the buffering of packets during the migration and subsequent processing at a higher speed to catch-up ('replay') before the final take-over ('switch phase', see FIG. 2 of [2]) may not be feasible in many applications. For example, in video processing, the computational complexity of processing at a higher than real-time speed may be (too) high. As such, the catch-up may take a long time or may require a significant or even excessive temporary increase in compute power.

In [3], Govindaraj et al. describe an uninterrupted hot-standby migration which is based on the redundancy migration scheme but combined with the concept of redundant servers. Namely, both the source and destination server are now redundantly instantiated. During the migration, a snapshot is created of the secondary source server while the primary source server continues to serve the client device uninterruptedly. The snapshot is restored simultaneously on both destination servers. After reception of the applications on the destination servers, both destination servers replay packets which are buffered by an SDN switch. After replay, the output of all four servers is compared, and if identical, the destination servers take over the service.

A disadvantage, as also acknowledged by [3] itself, is that the resource overhead of redundant servers is very high as the resources effectively double.

REFERENCES

[1] ETSI White Paper No. 28—*MEC in 5G networks*; First edition—June 2018, ISBN No. 979-10-92620-22-1.

[2] Govindaraj, K., & Artemenko, A. *Container live migration for latency critical industrial applications on edge computing*. In 2018 IEEE 23rd International Conference on Emerging Technologies and Factory Automation, Vol. 1, pp. 83-90.

[3] Govindaraj, K., Saha, M., Artemenko, A., & Kirstaedter, A. *Investigation of Uninterrupted Service Live Migration Using Software-Defined Networking*. In 2019 International Conference on Networked Systems, pp. 1-6.

SUMMARY

It may be desirable to enable a migration of the remote processing of a client's data stream from one remote server to another remote server in a manner which avoids or at least reduces interruptions in the processing of the data stream while addressing at least one of the disadvantages of [2] and [3], e.g., the need for catching-up by faster processing and/or having to instantiate all remote servers twice.

In accordance with a first aspect of the invention, a gateway system may be provided for use as a gateway between a client device and a remote server, wherein the client device may be configured to stream a data stream via the gateway system to the remote server for remote processing. The gateway system may comprise:
  a network interface for receiving the data stream and markers which identify respective blocks of packets in the data stream, wherein each identified block of packets may be independently processable;
  a processor subsystem which may be configured to, using the network interface:
    in response to an instruction or configuration to effect a migration of the remote processing from the remote server to a further remote server, determine a block of packets in the data stream from which block of packets onwards the further remote server is to start processing the data stream so as to effect or initialize the migration;
    when receiving the determined block of packets, stream the determined block of packets and subsequent blocks of packets of the data stream to the further remote server.

In accordance with a further aspect of the invention, client device may be provided and configured to stream a data stream to a remote server for remote processing. The client device may comprise:
  a network interface to a network;
  a processor subsystem which may be configured to, using the network interface:
    before or while streaming the data stream, generate markers for the data stream which identify respective blocks of packets in the data stream, wherein each identified block of packets may be independently processable;
    stream the data stream with the markers to enable a gateway receiving the data stream to determine a block of packets in the data stream from which block of packets onwards a further remote server is to start processing the data stream so as to effect or initialize a migration from the remote server to the further remote server.

In accordance with a further aspect of the invention, an orchestration system may be provided for orchestrating a migration of remote processing of a data stream from a remote server to a further remote server, wherein the data stream may be streamed by a client device to a gateway system and before the migration streamed by the gateway system to the remote server. The orchestration system may comprise:
  a network interface to a network;
  a processor subsystem which may be configured to, using the network interface:
    setup the further remote server for the remote processing;
    send an instruction message to the gateway system to effect or initialize a migration of the remote processing from the remote server to the further remote server by streaming the data stream to the further remote server, wherein the instruction message may instruct the gateway system to determine when to start streaming the data stream to the further remote server based on markers marking the data stream, wherein each marker may identify a respective block of packets in the data stream, each identified block of packets being independently processable.

In accordance with a further aspect of the invention, a server may be provided for processing a data stream which is streamed by a client device. The server may comprise:
  a network interface for receiving packets of the data stream;
  a processor subsystem configured to, via the network interface:
    in an operating mode, process the data stream to generate an output for use by the client device or another entity, wherein the data stream comprises blocks of packets, wherein each block of packets is independently processable, wherein the processor subsystem is configured to process the data stream by at least initially independently processing the blocks of packets; and
    preceding an invocation of the operating mode, in response to an instruction or configuration indicating to initialize the processing of the data stream, start processing packets of the data stream without generating the output.

In accordance with a further aspect of the invention, a computer-implemented method may be provided for providing a gateway function between a client device and a remote server, wherein the client device may be configured to stream a data stream via the gateway function to the remote server for remote processing. The method may comprise:
  receiving the data stream and markers which identify respective blocks of packets in the data stream, wherein each identified block of packets may be independently processable;
  in response to an instruction or configuration to effect a migration of the remote processing from the remote server to a further remote server, determine a block of packets in the data stream from which block of packets onwards the further remote server is to start processing the data stream so as to effect or initialize the migration;
  when receiving the determined block of packets, stream the determined block of packets and subsequent blocks of packets of the data stream to the further remote server.

In accordance with a further aspect of the invention, a computer-implemented method may be provided for streaming a data stream to a remote server for remote processing. The method may comprise:
  before or while streaming the data stream, generating markers for the data stream which identify respective blocks of packets in the data stream, wherein each identified block of packets may be independently processable;

streaming the data stream with the markers to enable a gateway receiving the data stream to determine a block of packets in the data stream from which block of packets onwards a further remote server is to start processing the data stream so as to effect or initialize a migration from the remote server to the further remote server.

In accordance with a further aspect of the invention, a computer-implemented method may be provided for orchestrating a migration of remote processing of a data stream from a remote server to a further remote server, wherein the data stream may be streamed by a client device to a gateway system and before the migration streamed by the gateway system to the remote server. The method may comprise:

setting-up the further remote server for the remote processing;

sending an instruction message to the gateway system to effect or initialize a migration of the remote processing from the remote server to the further remote server by streaming the data stream to the further remote server, wherein the instruction message may instruct the gateway system to determine when to start streaming the data stream to the further remote server based on markers marking the data stream, wherein each marker may identify a respective block of packets in the data stream, wherein each identified block of packets may be independently processable.

In accordance with a further aspect of the invention, a computer-implemented method may be provided for processing a data stream which is streamed by a client device. The method may comprise:

receiving packets of the data stream;

processing the data stream to generate an output for use by the client device or another entity, wherein the data stream comprises blocks of packets, wherein each block of packets may be independently processable, wherein the processing may comprise at least initially independently processing the blocks of packets; and before processing the data stream to generate the output, in response to an instruction or configuration indicating to initialize the processing of the data stream, start processing packets of the data stream without generating the output.

In accordance with a further aspect of the invention, a computer-readable medium may comprise transitory or non-transitory data representing a computer program. The computer program may comprise instructions for causing a processor system to perform any computer-implemented method described in this specification.

The above measures provide a client device which may transmit a data stream to be processed remotely. The data transmitted by way of the data stream may, but does not need to, be acquired by the client device itself. For example, the client device may capture sensor data using sensor(s) and encode and transmit the sensor data as a data stream in real-time or near real-time. In other examples, the client device may transmit a data stream not captured in real-time and/or not captured by the client device itself but rather, e.g., forwarded or retrieved from storage. In general, it may be preferred or required, e.g., by an application handling the data stream, to have the data stream processed in a substantially uninterrupted and continuous manner.

A remote server may be provided for processing the data stream, for example by applying image or video analysis algorithms to the data stream, by transcoding the data stream, by enhancing the data stream, or in any other way. The output of the remote server may be yet another data stream, such as a processed version of the original data stream (e.g., transcoded, enhanced, etc.) or a data stream containing a result of the processing, e.g., an analysis result. However, the output of the remote server may also be in non-stream form, e.g., single output instance. Examples of remote servers include, but are not limited to, edge nodes and cloud servers. It is noted that the term 'remote' may refer to the server being a separate entity from the client device, and typically being located upstream of the client device in a network and hence 'remote' of the client device. However, no limitations are intended in terms of (minimum) physical or network distance between the client device and server. The term 'remote processing' may simply refer to the processing by the remote server.

It may at some point in time be decided to migrate the processing of the data stream, which may be previously remotely processed by a first remote server, to another remote server, for example because of client mobility, overloading of the first remote server or desire for load balancing across servers. Both servers may also be referred to 'the' versus 'the further' or 'the other' remoter server, or as source server and destination server, or as source edge node and destination edge node, etc.

To orchestrate the migration of the remote processing, an orchestration system may be provided which may comprise known functionality for orchestrating a migration of processing from one remote server to another remote server. For example, the orchestration system may be configured to arrange a transfer of an application and a state of the application from the remote server to the other remote server, which application may be used to process the data stream. The orchestration system may also be configured to determine when to initiate the migration, for example based on external data, such as data characterizing the client mobility, server load data, etc.

In accordance with the above measures, the data stream may be sent to the remote server via a gateway system. The client device may provide markers for the data stream which may be used by the gateway system to, once instructed or configured to do so, send the data stream to the further remote server and/or to cease sending the data stream to the remote server. The markers may be generated by the client device to identify respective blocks of packets in the data stream, in which each identified block of packets may be independently processable by a remote server. Here, the term 'independently processable' may refer to there being no dependencies between the blocks of packets in at least some aspects of the processing by a remote server. For example, the blocks of packets may be independently decodable and independently processable by at least a first processing step, e.g., an initial or low-level processing. However, it is not excluded that subsequent, e.g., higher-level, processing steps by a remote server may apply to the respective outputs of the first processing of several blocks together and thereby (re)establish dependencies between consecutive blocks.

The above measures may be based on the insight that one of the main challenges in migrating remote processing between remote servers may be that there may be temporal dependencies in the processing, which means that a current state characterizing the processing of a packet, and thus the output of the processing, may be dependent on previous packets. This may mean that a destination server cannot simply assume the responsibilities from a source server at any moment in time, e.g., from any packet to the next.

Rather, it may be needed to ensure that the state of the processing is the same between source and destination server to have the destination server takeover. Indeed, [2] and [3] monitor the output of the source and destination server(s) to ensure that the temporal dependencies in the processing have been taken into account by the destination server(s), e.g., by having processed a sufficient number of consecutive packets, before finalizing the migration to the destination server(s).

In accordance with the above measures, markers are generated for the data stream which may indicate points in the data stream, namely in-between blocks, at which points the destination server may start processing the data stream without having temporal dependencies with respect to packets from a previous block (which may not be received by the destination server). The markers may thus indicate from which point onwards packets may be independently processable by at least a first (e.g., initial or low-level) processing step carried out by the destination server. The availability of these markers, which may be made available to the gateway system as part of the data stream or in any other way, may enable the gateway system to determine when to start sending the data stream to the further remote server. For example, if the gateway system is instructed or configured to effect the migration, it may monitor the markers to determine when packets of a next block arrive and start sending the packets from at least that point onwards to the destination server for remote processing.

The above measures may therefore avoid the need for buffering packets, as rather the destination server may be set up for the migration in advance and only be provided with packets of the data stream once setup. In particular, based on the markers, it may be known to entities involved in the migration that once the destination server starts processing packets of a new block, the output of the destination server may be used to replace the output of the source server since the output of both servers, in terms of at least a first processing step, may be the same. Such markers may also be used to delay determination of the processing by the source server until a new block is sent at least partially, or sent completely, to the destination server.

An advantage of the use of markers may be that their use may avoid the need for buffering packets at or for the destination server, thus avoiding a need for 'catching up' by having to process previously buffered packets as in [2]. Moreover, by observing markers in the data stream, the gateway system may determine that the destination server is ready to takeover, and thus cease sending packets to, and have the packets processed by, the source server. This may avoid needing to monitor and compare the output of both servers to determine when the destination server is ready to takeover, as in [2] and [3]. Namely, such comparison may need to be performed for a prolonged time to have sufficient confidence in the output being the same; e.g., the comparison of a single output instance may not suffice. Moreover, when the gateway system fully redirects the data stream to the destination server at a start of a new block, the simultaneous sending of packets to both servers and their simultaneous processing may not even be needed, as the destination server may take over from the source server after redirection. This may reduce network allocation and a need for duplicate processing. It may also not be needed to use duplicate servers as in [3].

Yet a further advantage may be that it may not be needed to transfer state information, or at least the size of such state information may be reduced, when migrating between remote servers, since such state information may otherwise be needed to reflect dependencies in the processing of packets of the data stream. In other words, if a migration were to be performed starting at a packet which has processing dependencies to previous packets, state information may need to be transferred between remote servers to reflect such dependencies. By starting the migration from a block boundary onwards, the further remote server may immediately start processing the block without such state information since there may not be any dependencies to previous blocks, at least in decoding and first processing steps.

Yet another advantage may be that since the gateway system may infer the block boundaries and thereby appropriate migration cuts based on the markers associated with the data stream, there may be fewer or no message exchanges among the further remote server, gateway system and/or orchestration system regarding the timing of the traffic re-direction. Given the speed at which packets are being processed in a network, using signals to orchestrate the traffic re-direction may not work. The latency of transmitting and processing a signal may cause packets be routed to the wrong remote server, causing data processing corruptions and other problems.

Yet another advantage of migration based on markers which indicate to which block a packet belongs to is that such migration may be resilient against packet re-ordering. For example, packets with an older, 'pre-migration' marker may still be forwarded to the source remote server, ensuring that the source remote server has all data from a data block available for processing. Such a packet may not be forwarded to the destination remote server, which may ensure that that the destination remote server edge only receives packets from data blocks that it is supposed to receive.

In an embodiment, the processor subsystem of the gateway system may be configured to, when streaming the determined block of packets to the further remote server, cease streaming the data stream to the remote server, or temporarily continue to stream the data stream in duplicate to the remote server. By ceasing to stream the data stream to the remote server from the determined block of packets onwards, the gateway system may effectively redirect the data stream to the further remote server from this block onwards and including this block. This may also be referred to as a 'direct migration', and may involve the gateway system terminating the forwarding of data packets to the remote server when starting to forward the data packets to the further remote server. This may avoid a need for duplicate traffic to, and processing by, the remote servers. In contrast, by temporarily continuing to stream the data stream in duplicate to the remote server, for example for a duration indicated by the orchestration system, the remote server may temporarily continue to process the data stream and to produce output, which may be advantageous if higher-level processing steps do exhibit dependencies between blocks, in which case the duration may be selected to ensure that the further remote server has processed a sufficient number of blocks before switching to the further remote server. This may allow the further remote server to already initialize its overall processing chain from the determined block onwards, while the actual output may be temporarily continued to be obtained from the remote server. At the same time, duplication and routing of packets to both remote servers in parallel may only need to occur for as long it is necessary. When the further remote server has received enough data to take over, markers in the data stream may indicate where and when the duplication and routing of packets to the remote server can be stopped.

In an embodiment, the processor subsystem of the gateway system may be configured to, in response to the instruction or configuration, already start streaming packets ahead of the determined block of packets to the further remote server to enable the further remote server to initialize its processing of the data stream. This may also be referred to as a 'dirty migration', and may for example involve the gateway system immediately starting to forward packets of a current block to the further remote server. While it may be known or expected that the further remote server may not yet produce accurate output based on these immediately forwarded packets, such forwarded packets may already allow the further remote server to setup its processing, for example by, in case of a video stream, inferring from the forwarded packets which video codec is used and by subsequently initializing an appropriate decoder pipeline. In other words, the gateway system may already forward a partial block to allow the further remote server to setup its processing to match the data stream being sent.

In an embodiment, the instruction may be received by the gateway system as an instruction message from an orchestration system configured to orchestrate the migration of the remote processing, and the processor subsystem of the gateway system may be configured to send a response message to the orchestration system indicating that the migration is effected or initialized. The instruction to effect the migration may be received from the orchestration system. To confirm that the migration is effected or initialized by the gateway system, the gateway system may send a response message to the orchestration system. For example, the gateway system may send a response message once it starts forwarding packets of the determined block to the further remote server, or when ceasing to forward packets to the remote server. Such a response may allow the orchestration system to take further actions, for example to free-up resources allocated on the remote server for the processing.

In an embodiment, the processor subsystem of the gateway system may be configured to send the data stream to the further remote server by at least one of:
  forwarding the packets of the data stream;
  creating new packets with a network address of the further remote server;
  changing a network address field in the packets received from the client device to identify the further remote server and subsequently sending said changed packets to the further remote server; and
  if the packets are encapsulated packets which encapsulate data to be remotely processed and include the markers in headers of the encapsulated packets, unpacking the encapsulating packets and sending the data to be remotely processed as the data stream to the further remote server.

In accordance with the above measures, the gateway system may not simply retransmit the packets but rather modify or create new packets so as to be able to send the data stream to the further remote server. This may for example enable the gateway system to redirect the data packets to the further remote server even though they were originally addressed to the remote server. In particular, the gateway system may extract markers from the data stream, e.g., from headers of encapsulating packets, and send the data contained in the data stream in a repackaged form to the further remote server, as the markers may not be needed by the further remote server.

In an embodiment, a mobile network may be provided comprising:
  a first base station, and a first gateway system and a first remote server for serving client devices connected to the first base station;
  a second base station, and a second gateway system and a second remote server for serving client devices connected to the second base station;
  wherein the first gateway system and the second gateway system are each an instance of the gateway system according to any one of claims 1 to 4;
  wherein the first gateway system is configured to:
    receive a data stream of a client device connected to the first base station and stream the data stream to the first remote server,
    in response to an instruction or configuration to effect a migration of the remote processing from the first remote server to the second remote server in anticipation of the client device being handed over to the second base station, stream the data stream via the second gateway system to the second remote server;
  wherein the second gateway system is configured to, after the client device is handed over to the second base station, take over the role as gateway system for the client device from the first gateway system.

In an embodiment, the processor subsystem of the client device may be configured to include the markers in the data stream. The client device may thus include the markers in the data stream itself, for example as metadata. This may avoid the need for markers to be sent separately to the gateway system, e.g., 'out-of-band'.

In an embodiment, the processor subsystem of the client device may be configured to include a marker in each packet of the data stream, wherein the marker may comprise a block identifier which identifies to which block of packets a respective packet belongs. By including a block identifier in the packets, the gateway system may be enabled to determine which packet belong to which block. This in turn may allow the gateway system to detect a change in block identifier and thereby determine when a newly received packet belongs to a new block. For example, the markers may be generated as pseudorandom identifiers or by sequentially numbering the blocks.

In an embodiment, the processor subsystem of the client device may be configured to include the markers in at least one of:
  a header of a transfer protocol used for the transfer of the data stream;
  headers of encapsulating packets which encapsulate data to be remotely processed;
  a tunnel which is established between the client device and an entity receiving the data stream, wherein the markers are included in encapsulating packets that form the tunnel.

The above represent various advantageous ways to provide the markers to the gateway system without a need to set up another transport mechanism of the markers to the gateway system, in separation of the transport of the data stream.

An advantage of using packet encapsulation is that a non-application specific ('universal') gateway system may be used, and the gateway system may not need access to application data contained in the data stream. The gateway system may thereby process the packets more efficiently (e.g., the application data or transfer protocol does not have to be parsed) and the application data may be encrypted when this is needed.

An advantage of including markers in a transfer protocol may be that the gateway system may be implemented using existing programming libraries, and the gateway system may serve multiple applications, provided that they are using the same transfer protocol and mark the packets consistently (for example using the same header field in a HTTP request).

In an embodiment, the processor subsystem of the orchestration system may be configured to generate the instruction message to be indicative of a block of packets in the data stream from which block of packets onwards the gateway system is to stream the data stream to the further remote server. For example, the instruction message may indicate an absolute or relative block. An example of the latter is the instruction message indicating that a 'next' block is to be streamed to the further remote server. An advantage of indicating relative blocks is that neither the orchestration system, nor the gateway system, may need to be aware of the exact value of the block identifiers. Rather, the gateway system may simply monitor or count transitions in block identifier.

In an embodiment, the processor subsystem of the orchestration system may be configured to include in the instruction message at least one of:

a network address of the further remote server;
a migration type which indicates whether or not the data stream is to be temporarily continued to be streamed in duplicate to the remote server after starting to stream the data stream to the further remote server;
a migration duration which is indicative of a number of blocks of packets for which the data stream is to be temporarily continued to be streamed in duplicate to the remote server after starting to stream the data stream to the further remote server; and
information which informs the gateway system how to identify the markers in the data stream or in metadata associated with the data stream.

In addition to indicating that a migration is to be effected, the orchestration system may also provide further information in its instruction to the gateway system, such as a network address of the further remote server, a migration type (e.g., the aforementioned 'direct' or 'dirty' migration types, or a 'loading' migration type as described elsewhere in this specification), for some migration types the number of blocks for which packets are to be sent in duplicate to both remote servers, and/or information for the gateway system on how to identify the markers in the data stream or in metadata associated with the data stream. The latter type of information may for example take the form of a 'marker filter' by which the gateway system may filter out the markers from the data stream or from the therewith associated metadata. An advantage of the use of a marker filter is that when a gateway system may handle different data streams where markers are located at different locations in a packet; the maker filter may allow the gateway system to find the markers in any such data stream.

In an embodiment, the (remote) server the server may be an edge node or a system of edge nodes, for example of and/or in a telecommunication network.

It will be appreciated by those skilled in the art that two or more of the above-mentioned embodiments, implementations, and/or aspects of the invention may be combined in any way deemed useful.

Modifications and variations of any entity described in this specification, e.g., of any system, server, device, method or computer program, which correspond to the described modifications and variations of another one of these entities may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figures 1A, 1B:
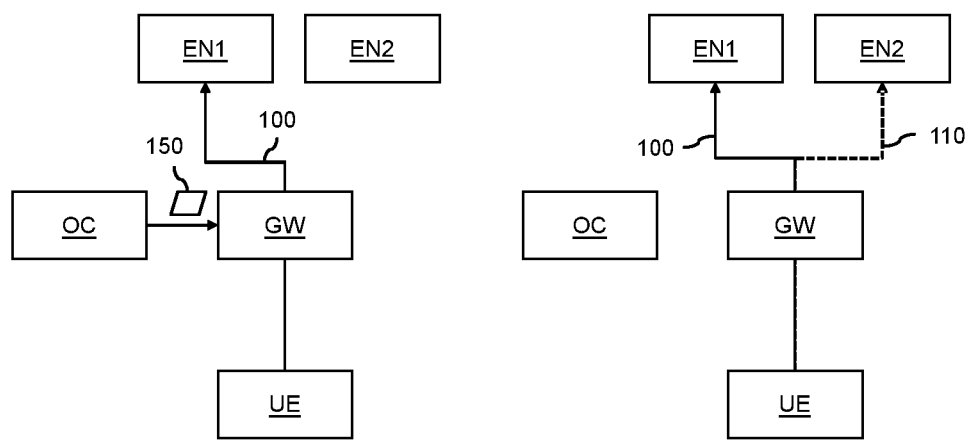
FIG. 1A shows a user equipment streaming a data stream to a first edge node via a gateway system, and an orchestration system instructing the gateway system to effect a migration of the remote processing to a second edge node.
FIG. 1B shows the gateway system, in response to the instruction from the orchestration system, sending packets of the data stream to the second edge node.

It should be noted that items which have the same reference numbers in different figures, have the same structural features and the same functions, or are the same signals. Where the function and/or structure of such an item has been explained, there is no necessity for repeated explanation thereof in the detailed description.

REFERENCE SIGNS LIST

The following list of references and abbreviations is provided for facilitating the interpretation of the drawings and shall not be construed as limiting the claims.

BS(X) base station (X)
EN(X) edge node (X)
GW(X) gateway system (X)
OC orchestration system
UE user equipment
100 data stream to first edge node
110 recently instantiated data stream to second edge node
120 data stream to second edge node 150 instruction message
160 response message
200 packets of data stream
210 block of packets
212 incomplete block of packets
230 block boundary indicated by markers
240 next block of packets
300 data stream to first edge node
310 recently instantiated data stream to second edge node
320 data stream to second edge node
350 client device movement
400 processor system representing gateway system, orchestration system or remote server
410 network interface
420 processor subsystem
430 data storage
500 processor system representing client device
510 network interface
520 processor subsystem
530 data storage
540 camera interface
550 camera
600 computer-readable medium
610 non-transitory data
1000 exemplary data processing system
1002 processor
1004 memory element
1006 system bus
1008 local memory
1010 bulk storage device
1012 input device
1014 output device
1016 network adapter
1018 application

DESCRIPTION OF EMBODIMENTS

The following embodiments relate to the streaming of a data stream by a client device to a remote server for remote processing, which streaming may take place via a gateway system. By way of example, the following assumes the remote server to be an edge node, or a system of edge nodes, which may be configured to provide an application service to a client device (with such application services also being referred to as 'edge application services' or simply as 'edge services'), and the remote processing of the data stream to be a remote processing which is performed by the application service. However, the concepts and mechanisms described in this specification equally apply to any other type of remote server and to any other type of remote processing, such as a cloud server providing a cloud processing service to a client, with other examples of remote servers being given in this specification.

Furthermore, also by way of example, the client device in the following examples is a so-called User Equipment (UE) of a mobile network which adheres to one or more 3GPP standards. This device may in the following also be referred to as 'mobile device' by having connectivity to the mobile network. It is noted that while the UE is described in the following examples to be capable of movement, and in fact shown to move, this is not a limitation, in that the described measures equally apply to devices having connectivity to the mobile network (and thus being 'mobile devices') which are stationary or not moving. It is noted that the concepts and mechanisms described in this specification equally apply to any other type of client device, which includes mobile devices for use with other, e.g., non-3GPP, types of mobile network infrastructures, such as Wi-Fi-based or satellite-based mobile network infrastructures, as well as client devices for use with non-mobile, fixed-line network infrastructures.

FIG. 1A shows a client device in the form of user equipment UE streaming a data stream 100 to a first edge node EN1 via a gateway system GW. Such streaming may take place via a network (not explicitly shown), such as a mobile network with its mobile network infrastructure. The first edge node EN1 may process the data stream 100 to generate an output. For example, the output may comprise a processed version of the data stream 100, e.g., enhanced or augmented, or any other type of output result, for example an analysis result resulting from an analysis of the data stream 100. The streaming of the data stream 100 may take place via the gateway system GW in that the gateway system GW may receive packets of the data stream from the client device UE and subsequently send packets to the first edge node EN1. Such sending may include forwarding the packets in an unmodified or substantially unmodified manner, but may also include modifying the packets, e.g., by changing a header of the packets, or by repackaging the data content of the received packets in new packets to be sent to the first edge node EN1. It will be appreciated that the data stream received by the gateway system GW and the data stream sent by the gateway system GW may both be referred to as 'the' (same) data stream on the basis of said data streams containing substantially the same data content. It is further noted that the functionality of the entities described in this paragraph may be considered known per se.

Figures 1C, 2A:
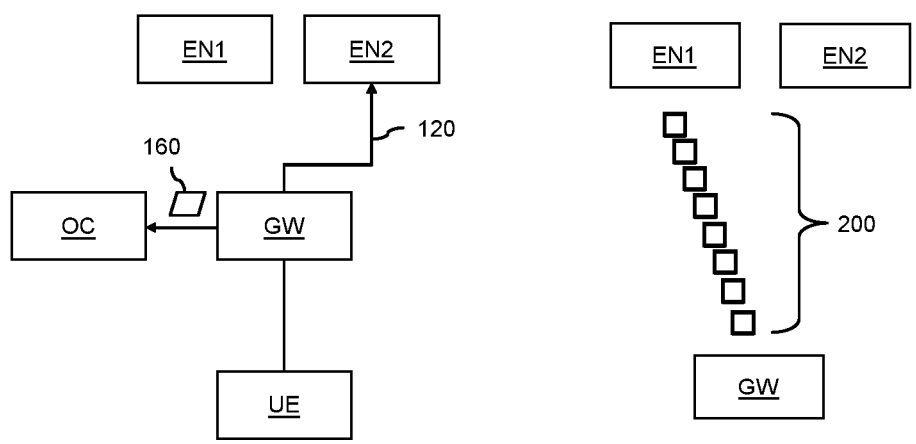
FIG. 1C shows the gateway system completing the migration to the second edge node by ceasing to send packets of the data stream to the first edge node.
FIG. 2A illustrates the data stream comprising a sequence of packets which are shown to be sent by the gateway system to the first edge node.

The gateway system GW may be configured to assist in a migration of the remote processing from the first edge node EN1 to a second edge node EN2. Such a migration may be orchestrated by an orchestration system OC. The orchestration system OC may be configured to determine when to start such a migration, e.g., based on various known considerations and criteria, and to instruct the gateway system GW by way of an instruction message 150 to assist in the migration, namely by effecting the migration by redirecting the data stream of the client device. Here, the term 'effecting' may refer to the gateway system GW taking actions to bring about the migration. It will be appreciated, however, that other entities, such as the orchestration system OC, may typically also play an important role in the overall migration. The instruction message 150 sent to the gateway system GW may indicate to the gateway system GW that it is to start sending the data stream to the second edge node EN2, and at a given point in time, stop sending the data stream to the first edge node EN1. Accordingly, as is also shown in FIG. 1B, the gateway system GW may start sending packets to the second edge node EN2, and thereby start streaming the data stream 110 to the second edge node EN2, while in this example continuing to stream the data stream 100 to the first edge node EN1. During this time, the second edge node EN2 may also be referred to as a 'loading' edge node while the first edge node EN1 may continue to serve the client device UE and thus be referred to as a 'serving' edge node. FIG. 1C shows the gateway system GW completing its part in the migration to the second edge node EN2 by ceasing to send packets of the data stream to the first edge node EN1. The gateway system GW may then confirm to the orchestration system OC that the migration has been completed by sending a response message 160 to the orchestration system OC.

In the example of FIGS. 1A-1C and others, the data stream may contain blocks of packets which may be independently processable by a respective edge node EN1, EN2, in that such blocks may be at least independently decodable and, in some examples, processable in accordance with a first, or a first set of, processing step(s). The client device UE may be configured to generate markers which identify such respective blocks of packets, for example by assigning a same block identifier to respective packets of a block of packets. Such markers may be made available to the gateway system GW. For example, the markers may be included in the data stream sent by the client device UE to the gateway system GW. The gateway system GW may then determine when to start sending packets of the data stream to the second edge node EN2, and/or when to stop sending packets of the data stream to the first edge node EN1, based on the markers associated with the data stream. It is noted that the markers generated by the client device may in the following also be referred to as 'migration markers' as they may be generated by the client device UE for the specific purpose of assisting in the migration of the remote processing of the data stream.

With continued reference to FIGS. 1A-1C, a specific example may involve the following. Here and elsewhere, the remote servers may also be referred to as 'edges' instead of 'edge nodes' to include embodiments in which the remote server is a single edge node and embodiments where it is embodied by a system of edge nodes.

1. An application on the client device UE may be served by a processing function running on the first edge EN1. The client device UE may connect to the first edge EN1 via the gateway system GW.

2. When migration to another edge is desired, the orchestration system OC may instantiate the processing function on a second edge EN2, and may await instalment and/or booting of the processing function on the second edge EN2.

3. The orchestration system OC may instruct the gateway system GW to assist in a migration from the first edge EN1 to the second edge EN2, for example by way of the aforementioned instruction message 150.

4. Upon receiving the instruction message 150, the gateway system GW may start monitoring the data stream received from the client device UE for migration markers and may take one of the following actions:
   a. Direct migration: upon receiving a packet belonging to a next data block, the gateway system GW may cease forwarding the data stream to the first edge EN1 and start forwarding the data stream to the second edge EN2;
   b. Loading migration: upon receiving a packet belonging to a next data block, the gateway system GW may start duplicating the data stream to the second edge EN2 and after having receiving the next block or in general a number of further data blocks, cease forwarding the data stream to the first edge EN1;
   c. "Dirty" migration: the gateway system GW may directly start duplicating the data stream to the second edge EN2 and thereby forward packets of a block of which the first packet(s) may have already been sent to the first edge EN1 and which first packet(s) may therefore not be made available anymore to the second edge EN2. Effectively, the gateway system GW may start forwarding a currently received packet irrespective of its position (e.g., start, middle, end) in a block. After receiving one or more data blocks, or after receiving a packet belonging to a next data block, the gateway system GW may cease forwarding the data stream to the first edge EN1.

The type of action may also be referred to as 'migration type' and its selection may depend on the application that the data stream is associated with, in that for some types of applications, a particular migration type may be required or preferred.

5. The gateway system GW may notify the orchestration system OC that the migration is completed, e.g., using the aforementioned response message 160.

6. The second edge EN2 may continue as a serving edge, referring to the edge serving the client device UE by remotely processing its data stream.

7. The orchestration system OC may terminate and clean-up the instance of the processing function on the first edge EN1.

FIGS. 2A-2D illustrate the aforementioned migration types. In general, depending on the migration type, no, a partial, or full data blocks may be duplicated and routed to both edges. The migration type may be chosen based on the application requirements. Applications that do not require any initialization after receiving a data block may use a direct migration, which may be most efficient in terms of network resource allocation. Other applications may benefit from temporary duplication of traffic.

FIG. 2A illustrates the data stream comprising a sequence of packets 200 which are shown to be sent by the gateway system GW to the first edge EN1.

Figures 2B, 2C, 2D:
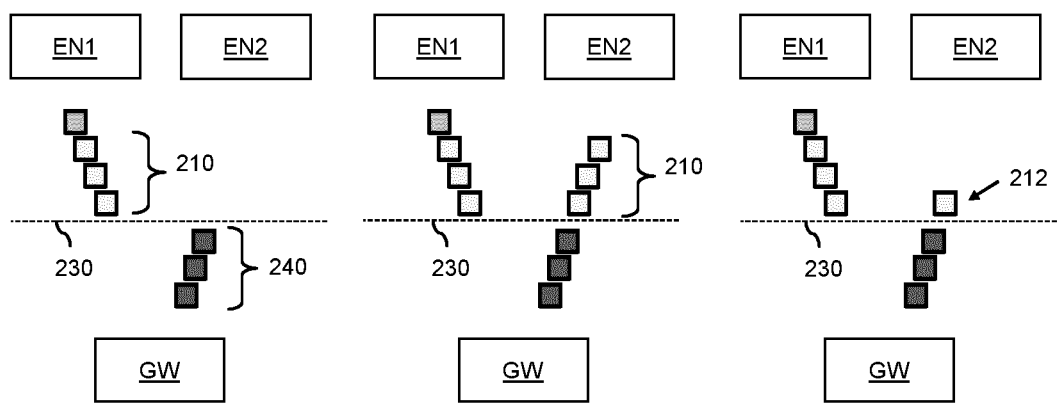
FIG. 2B illustrates the data stream comprising blocks of packets, and the gateway system redirecting the data stream to the second edge node from a block boundary between a first block and a second block onwards.
FIG. 2C illustrates an alternative to FIG. 2B, showing the gateway system sending a given block of packets to the second edge node while continuing to send the given block of packets in duplicate to the first edge node, and only ceasing to send packets to the first edge node from a following block of packets onwards.
FIG. 2D illustrates an alternative to FIGS. 2B and 2C, showing the gateway system already starting to partially forward the given block of packets in response to an instruction to migrate the remote processing to the second edge node.

FIG. 2B shows two consecutive blocks 210, 240 of packets in the data stream, and the gateway system redirecting the data stream to the second edge EN2 from a block boundary 230 between a first block 210 and a second block 240 onwards. This type of migration may correspond to the aforementioned 'direct' migration type.

FIG. 2C illustrates an alternative to FIG. 2B, showing the gateway system GW sending the first block of packets 210 to the second edge EN2 while continuing to send the first block 210 in duplicate to the first edge EN1, and only ceasing to send packets to the first edge EN1 from the second (or later) block 240 onwards;

FIG. 2D illustrates an alternative to FIGS. 2B and 2C, showing the gateway system GW promptly starting to forward packets of the first block 210 to the second edge EN2 in response to an instruction to migrate the remote processing, namely by promptly forwarding a current packet of the first block 210. Here, the term 'promptly' may refer to a forwarding without awaiting a block boundary. Since this current packet is likely not to be the first packet of the first block 210, this may result in a transmission of an incomplete version 212 of the first block 210 to the second edge EN2. This type of migration may correspond to the aforementioned 'dirty' migration type.

It will be appreciated that while a 'dirty' migration may seem inefficient, since the data of a non-complete data block may be transmitted to the second edge EN2, the second edge EN2 may already use this data when initializing the processing. For example, in the case of a video stream, the second edge EN2 may use a partial data block for inferring the video/audio codec and initialize the appropriate decoder pipeline. Once a new data block is received, which may be fully decodable and processable, the decoder pipeline may then be set up, reducing the start-up before producing output.

The following describes various embodiments of the gateway system, including distributed and non-distributed embodiments, and of the migration markers. Here, continued reference is made to the remote servers as edge nodes or edges.

Gateway System

Depending on the type of connectivity between the client device and the edge, the implementation of the gateway system may take various forms.

For example, the transport protocol between the client device and edge may be stateful, e.g., when using TCP, or stateless, e.g., when using UDP, and to a certain extent also when using short lived TCP session. In some examples, the transport protocol may be session-based and the gateway system may act a proxy server or forwarding unit. In such cases, the gateway system may break the connection between the client device and edge, making the client device connect to the gateway system, the gateway system connect to the edge, and the gateway system forward traffic from the one connection to the other connection. When the gateway system receives an instruction to perform a migration from the orchestration system, the gateway system may establish a second connection with the second edge, now forwarding the incoming data to both edge connections. In other examples, the transport protocol may be stateless. In such cases, the gateway system may also act as a proxy server, recreating packets with the same data and sending them to the destination edge(s).

In yet other examples, the gateway system may be implemented by elements belonging to the network, i.e., network elements, while forwarding may be based on routing and switching principles. Duplication on network level may means duplicating the actual network packets, potentially rewriting network level addresses in the headers. In a fixed network, network elements with which the gateway system may be formed may be Software Defined Network (SDN)-enabled switches. In such cases, the orchestration system may instruct a network controller to execute a migration. In the context of a 5G network and a Service Based Architecture (SBA), the orchestration system, embodied as Application Function (AF), may request new rules on the User Plane Function (UPF) via Policy Control Function (PCF) and Session Management Function (SMF). In such an example, functionality may be added representing the gateway system's functionality of monitoring packets and executing the migration.

From the perspective of the client device, addressing the edges may be transparent, meaning that the client device may not need to select a different edge by using a different network address but may rather may address the edge via a single network address and network, while the gateway system may handle the routing to the appropriate edge. Such transparent addressing may be established in various ways.

For example, the actual edge instances (or virtual edge instances on top of real hardware) may have different network addresses, e.g., IP addresses. These network addresses may be shielded, and in some examples may even be in a private IP address space, and known to the orchestration system and gateway system but not to the client device. The network address of the gateway system may be communicated to the client device. The packets of the client device may then arrive at the gateway system, which may forward the packets to the edge(s) and thereby to a new network address. Depending on the type of gateway system, the gateway system may create new packets with the destination network address of the edge, or the gateway system may execute a Network Address Translation (NAT) mechanism changing the destination network address in the packets before forwarding them.

Another example is that the edge instances and the gateway system may share a single network address, which may be the network address that may be communicated to the client device. The network address may for example be a re-used IPv4 address or an IPv6 anycast address. To prevent misdirection of packets, the network organization and routing may be organized according to zones (sometimes referred to as segments), with the gateway system being the point where packets from one zone may enter the other zones. In a configuration with two edges, at least three zones may be identified: between the client device and gateway system, between the gateway system and a first edge instance, and between the gateway system and a second edge instance. The network zones may be fenced from each other, meaning that routing to the network address may only be possible to one destination, e.g., depending on the zone either the gateway system or one of the edges. The gateway system may have multiple (virtual) network interfaces to the different network zones.

Centralized Vs. Distributed Gateway System

The gateway system may be a single instance located in the network between the client device and both (source and destination) edges. This may be a relevant implementation when there is no or little client mobility but migration is still desired. For example, a single gateway node may be used for optimization of resources, scaling in or out compute resources. In some examples, the gateway system may effect migration between edges. In other examples, the gateway system may facilitate migration between compute nodes in an edge cluster. In yet other examples, the gateway system may facilitate migration from a cloud node to an edge node, or from an edge node to a cloud node. In yet other examples, the gateway system may facilitate migration between cloud nodes or any other remote servers.

With continued reference to FIG. 1A-1C, here the migration between two edges EN1, EN2 is shown using one gateway system GW. Initially, traffic may be routed to the first edge EN1 (e.g., the current serving edge). When a migration is desired, and following the instruction from the orchestrator system OC, the gateway system GW may duplicate the traffic to the second edge EN2. Once the second edge EN2 is ready and the gateway system GW has inferred the state of the second edge EN2 based on the migration markers in the data stream, traffic routing to the first edge EN1 may be stopped and the second edge EN2 may continue as the serving node. Here, the phrasing 'inferred the state . . . based on the migration markers' may refer to the gateway system GW being able to determine whether the state of the second edge EN2 (sufficiently) matches that of the first edge EN1 and thereby when the second edge EN2 is ready to take over the remote processing task from the first edge EN1 by determining when a number of complete blocks of data have been sent to, and have been processed by, the second edge EN based on the markers in the data stream.

Figures 3A, 3B:
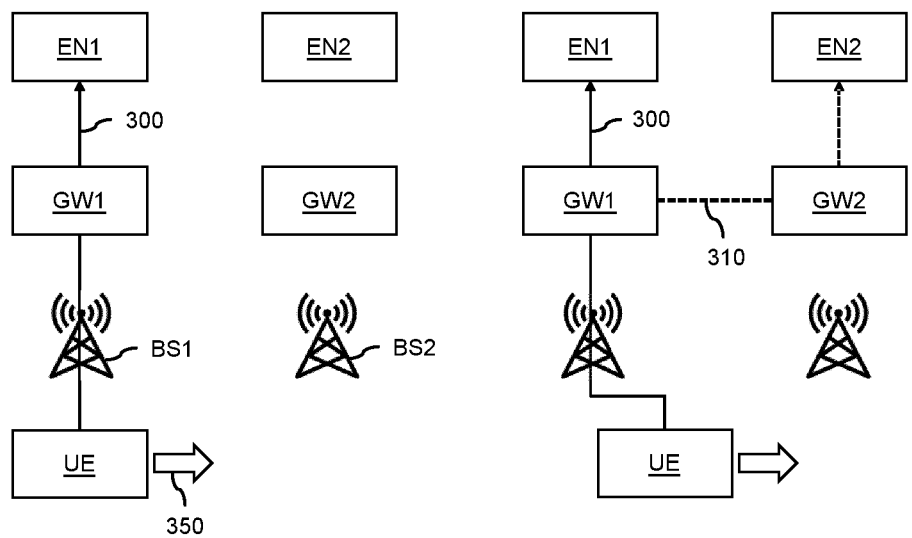
FIGS. 3A-3D show the client device physically moving and being handed over from a first base station to a second base station, while illustrating the traffic flow associated with the data stream from the client device to a respective edge node.
Figures 3C, 3D:
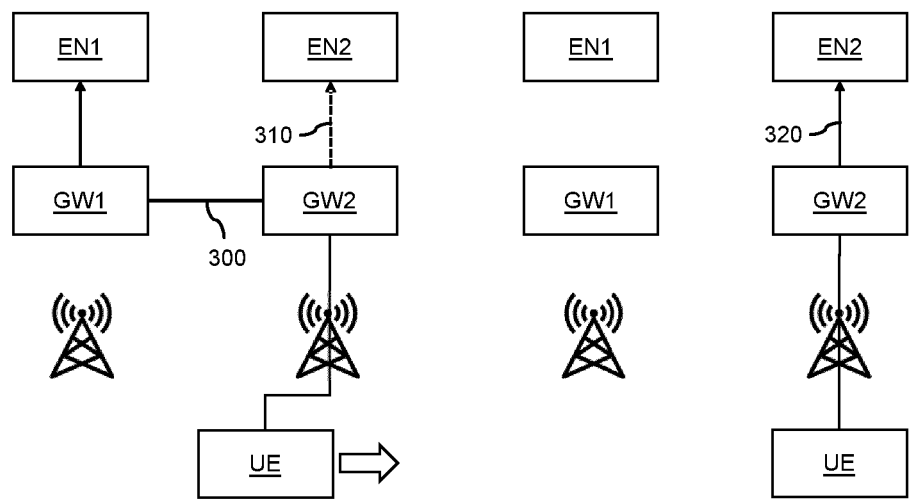

FIGS. 3A-3D illustrates that the gateway system may also be instantiated multiple times. For example, a first gateway system GW1 may be located between a first base station BS1 and a first edge EN1, while a second gateway system GW2 may be located between a second base station BS2 and a second edge EN2. The gateway systems may together form a gateway supra-system. There may be direct connectivity between the two or more gateway systems or indirect connectivity, for example via a third (central) gateway system. As shown in FIG. 3A, the client device UE may be initially connected to the first base station BS1 and send its data stream 300 via the first gateway system GW1 to the first edge EN1. The client device UE may then move, as shown in FIGS. 3A-3C by an arrow 350. As shown in FIG. 3B, when a handover to a second base station BS2 is anticipated, the first gateway system GW1 may duplicate the data stream and may route the duplicate data stream 310 towards the second gateway system GW2. Such routing to the second gateway system GW2 may also be performed if a handover to the second base station BS2 has already taken place but the first gateway system GW1 is still attached to the client device UE, for example when a UPF reselection has not taken place yet. The second gateway system may then forward the data stream 310 to the second edge EN2. As shown in FIG. 3C, when the client device's handover to the second base station BS2 has taken place and the second gateway system GW2 takes over the role of the first gateway system GW1, the second gateway system GW2 may forward the traffic to the first gateway system GW1 while the first edge EN1 may continue to be the serving edge node. As shown in FIG. 3D, once the second edge EN2 is loaded, the second gateway system GW2 may, based on the migration markers in the data stream, cease forwarding the data stream 300 to the first gateway system GW1 from a block boundary onwards while the second edge EN2 may become the serving edge node. In an example of a 5G network in which the gateway system is embodied by a UPF (User Plane Function), the above functionality may be obtained by modifying an SSC mode 2 or 3 PDU Session Anchor Relocation procedure to incorporate the detection and use of migration markers.

When using a single gateway system, e.g., as in FIGS. 1A-IC, the use of session-based and stateless transport protocols may be considered easy to obtain because the connection between the client device and the gateway system may not be altered. However, using several gateway systems, e.g., as in FIGS. 3A-3C, may be more involved. For example, when using a stateless protocol, and when forwarding based on network packets, performing a handover from a first gateway system to a second gateway system may be transparent. However, when using a session-based transport protocol, the session may be broken after a handover. The serving gateway system may have to inform the client device that it may need to re-establish the connection (e.g., using a TCP RST (reset)) or the TCP handover has to be facilitated using a technique such as described in *A SDN Based Method of TCP Connection Handover*, ICT-EurAsia, vol 9357, 2015. However, it is noted that re-establishing a connection or carrying out a TCP handover is relatively fast and may also have happened in the case of an edge migration without the gateway system in its path.

With regards to addressing, in case of several gateway systems, additional rules on routing and network zone fencing may be defined. When using different network addresses for the edges, routing from the gateway system may need to be limited to one edge only. For example, the second gateway system GW2 may address the edge EN2 directly, but the network may be configured not to route traffic directly to the edge EN1. Instead, the network may be configured in such a way that traffic to the first edge EN1 is routed through the first gateway system GW1. Similarly, when using a single network address and fences between different zones in the network, the second gateway system GW2 may address the second edge EN2 using the network address on one of its network interfaces (zones) while address the first gateway system GW1 on the other network interface (zone). By ensuring all involved gateway systems process the same packets, the gateway systems may be configured to maintain a same state, and may independently from each other execute their part in the migration Data Stream Marking The client device may mark packets of the data stream to allow packets to be assigned to respective blocks. In some examples, a client application running on the client device may mark or control marking of the packets since the application may be aware of relations between packets in a data block, and possibly of relations between data blocks. Depending on the type of marking, the client application may include the markers in data packages or provide an Operating System (OS) with marker information to enable the OS to carry out marking on behalf of the client application.

Message-Based Marking

In some examples, the client application may format application data for being remotely processed so that messages (e.g., self-contained units of data) may be identified while a data block may consist of several messages. Each message may contain a marker of the associated data block. The gateway system may act as an application-level proxy server, forwarding the messages to the edge nodes. The marker may be part of an application data structure or integrated in a transfer protocol.

Example 1: An example where the marker is included in the data structure, the data structure being formatted using the common JSON format, is given below.

```
{
    "marker" = "aGVsbG8taS1hbS1hLW1hcmtlcg==",
    <other json fields containing the application data>
}
```

With this type of marking, the messages may be forwarded as-is to the destination edge(s). Messages with the marker included in the data structure may be included in UDP packets, or part of a TCP stream, or may be transported using network protocols like WebSockets. The gateway system may be specific to the application.

Example 2: An example where the marker is included in the transfer protocol, the marker being a header field in an HTTP POST request, is given below.

```
POST /message HTTP/1.1
Host: example.org
Content-Type: application/json
Content-Length: 148
X-Marker: aGVsbG8taS1hbS1hLW1hcmtlcg==
<application data>
```

Although the above examples are using text-based protocols, message-based marking may also be applied to binary messages. It is noted that with message-based marking, the gateway system may need to be trusted by the client application, as the gateway system may act as a man-in-the-middle. Application data, including the data block markers, may be encrypted between the client application and the gateway system. However, in order to perform the migration, the gateway system may need to have access to the decrypted marker, and thereby also to the other application data.

Packet Encapsulation-Based Marking

In some examples, application data to be processed remotely may be encapsulated in marker packets before they are transmitted, effectively adding an extra layer to the TCP/IP or UDP/IP stack. This may be performed by a non-application specific gateway system ('universal', in that it may serve multiple applications) which may not need access to the application data. For example, the gateway system may be implemented as proxy server, or using Software Defined Networking (SDN) techniques.

In some examples, the client application may perform the encapsulation before providing the data packet to the OS. The client application may be configured to prevent packet fragmentation (e.g., by not exceeding the maximum packet size) and avoid packets from being combined into a stream (e.g., by disabling Nagle's algorithm when using TCP). In other examples, the OS may provide marking-as-a-service towards the client application, for example accessible by the client application via APIs. In addition to providing low level primitives allowing to open TCP/UDP sockets and reading/writing from/to them, the OS may provide marked version of these TCP/UDP sockets and associated functions. For example, the OS may offer a write primitive where the client application may provide a file description to the marked socket, the data and the length of the data, and the marker to be used for packets transporting the provided data. The OS may ensure that all data is encapsulated in a marker packet, enabling a network level-based implementation of the gateway system.

The OS of the gateway system and edge nodes may provide similar functionality for reading from a marked version of a socket. When reading from a marked socket, the OS may provide the application with the data and its associated marker. The OS may ensure that a read invocation may only provide data belonging to a single data block, allowing to implement a proxy server-based gateway system.

Tunnel-Based Marking

Tunnel-based marking may be considered as a special form of encapsulation-based marking. In some examples, a client device may establish a tunnel with the gateway system and the markers may be part of the encapsulating packages that form the tunnel. In some examples, the tunnel may be (or may be part of) a VPN (Virtual Private Network) connection between the client device and the gateway system. In other examples, the tunnel may be part of an LTE/5G network connection, the tunnel being for example a GTP (GPRS Tunneling Protocol) for a PDU (Packet Data Unit) session and the gateway system being embodied as a UPF.

When using tunnels, the OS may provide applications with a virtual network interface for which packets written to the network interface will be tunneled. In some examples, marking may be similar to encapsulation-based marking, where the OS may provide an API with write primitives that include marker parameters. In another embodiment, the OS may provide a function to configure the network interface, allowing the application to set the marker to be used for all outgoing packets, until the marker is cleared or a new marker has been set. At the gateway system, the tunnel may be terminated and the gateway system may unpack the packets before forwarding them to one or more edge servers.

Migration Instruction

The orchestration system may instruct the gateway system to execute a migration. Depending on the embodiment of the gateway system, this instruction may have different forms, including but not limited to an SDN rule, a PCF rule in 5G networks, a call to an API, etc. In some examples, the instruction may be represented by an appropriate configuration of the gateway system. Independent from the embodiment of the instructions, the instructions may contain fields such as:

Destination edge: The address of the destination edge in the migration. The addresses may for example be a URL, a hostname, an IP addresses, an identifier for a network zone, or a network interface identifier. The URL, hostname, or IP address may include or may be accompanied with a (UDP/TCP) port number.

Migration type: This may indicate a migration type, such as the aforementioned direct, loading, or dirty migration.

Migration duration: In case of a loading or dirty migration, the gateway system may send at least one data block to both edges, but may duplicate more data blocks when this is needed. The duration may be the number of data blocks that may be sent to both edges in a migration before the destination edge may take over and the gateway system may cease forwarding packets to the first edge.

Marker filter: An instruction or format for the gateway system on how to find the marker. The filter may for example describe the data type, byte offset and length in a packet. Alternatively, the filter may be a key/path for a JSON formatted document, or a regular expression for other text-based messages.

Figure 4:
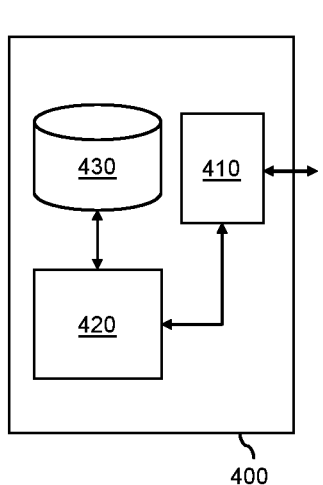
FIG. 4 shows a processor system which may be exemplary for the gateway system, the orchestration system or the remote server.

FIG. 4 shows a processor system 400 which may be exemplary for the gateway system, the orchestration system or the remote server as described in this specification, meaning that the processor system 400 may embody either of these entities. The processor system 400 may comprise a network interface 410 for data communication via a network (not shown itself). The network interface 410 may for example be a wired communication interface, such as an Ethernet or fiber-optic based interface. The network may for example be the Internet or a mobile network, with the processor system 400 being part of and connected to a fixed part of the mobile network. Alternatively, the network interface 410 may be a wireless communication interface, e.g., being of a type as described below for the client device 500 of FIG. 5. In other examples, the processor system 400 may be a subsystem of a larger system, e.g., a supra-system. In such cases, the network interface 410 may be an internal interface of the supra-system, for example a virtual, software-based network interface.

The processor system 400 may further comprise a processor subsystem 420 which may be configured, e.g., by hardware design or software, to perform the operations described in this specification in as far as pertaining to the entity that the processor system is embodying, e.g., the gateway system, the orchestration system or the remote server. In general, the processor subsystem 420 may be embodied by a single Central Processing Unit (CPU), such as a x86 or ARM-based CPU, but also by a combination or system of such CPUs and/or other types of processing units. In embodiments where the processor system 400 is distributed over different entities, e.g., over different servers, the processor subsystem 420 may also be distributed, e.g., over the CPUs of such different servers. As also shown in FIG. 4, the processor system 400 may comprise a data storage 430, such as a hard drive, a solid-state drive or an array of such hard and/or solid-state drives, etc., which may be used to store data.

In some examples, the processor system 400 may be implemented by a network node or a system of network nodes. In some examples, the processor system 400 may be configured to implement the gateway system as a User Plane Function (UPF). In some examples, the processor system 400 may be configured to implement the orchestration system as an Open Source NFV Management and Orchestration (MANO) system. In some examples, the processor system 400 as the orchestration system may be part of a client device, or distributed over different client devices.

Figure 5:
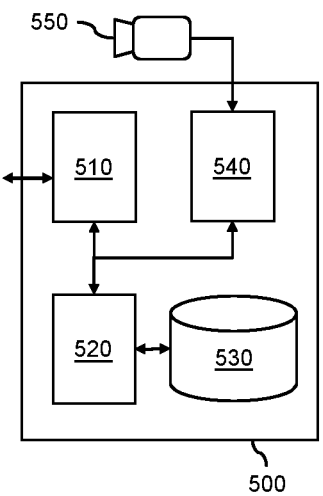
FIG. 5 shows a processor system which may be exemplary for the client device, with the processor system comprising a camera interface to a camera.

FIG. 5 shows a processor system 500 which may be exemplary for the client device described in this specification, and which may in the following also be simply referred to as client device 500. The client device 500 may comprise a network interface 510 to a network so as to be able to communicate with a gateway system via data communication. The network interface 510 may for example be a wireless communication interface, which may also be referred to as a radio interface, and which may be configured to connect to a mobile network infrastructure. In some examples, the network interface 510 may comprise a radio and an antenna, or a radio and an antenna connection. In a specific example, the network interface 510 may be a 4G or 5G radio interface for connecting to a 4G or 5G mobile network adhering to one or more 3GPP standards, or a Wi-Fi communication interface for connecting to a Wi-Fi network infrastructure, etc. In other examples, the network interface 510 may be a wired communication interface, for example of a type as described for the processor system 400 of FIG. 4. It is noted that the data communication between the client device 500 and a gateway system and/or remote server may involve multiple networks. For example, the client device 500 may be connected via a radio access network to a mobile network's infrastructure and via the mobile network's infrastructure to the Internet, with the remote server being a server which is also connected to the Internet. In other examples, the gateway and/or the remote server may be part of or connected to the same (mobile) network to which the client device 500 may be connected.

The client device 500 may further comprise a camera interface 540 by which the processor system 500 may acquire camera data, for example in (near) real-time for being streamed in (near) real-time to the remote server for processing. In other examples, the client device 500 may comprise the camera as an internal component. In yet other examples, the client device 500 may, in addition or alternatively to the camera interface, comprise a sensor data interface to an external or internal sensor, and may be configured to stream the acquired sensor data to the remote server for processing. In yet other examples, the client device 500 may retrieve the data to be streamed from elsewhere, e.g., from a built-in storage, another network-connected entity, etc.

The client device 500 may further comprise a processor subsystem 520 which may be configured, e.g., by hardware design or software, to perform the operations described in this specification in as far as pertaining to a client device or UE or in general to the client-side streaming of a data stream and the generating of markers for the data stream. In general, the processor subsystem 520 may be embodied by a single Central Processing Unit (CPU), such as a x86 or ARM-based CPU, but also by a combination or system of such CPUs and/or other types of processing units, such as Graphics Processing Units (GPUs). The client device 500 is further shown to comprise a data storage 530 which may be of a same or similar type as described for the processor system 400 of FIG. 4, and which may be used by the client device 500 to store data, for example to store and/or buffer the data stream to be sent to the remote server, and/or the markers which are generated for the data stream.

Although not explicitly shown in FIG. 5, the client device 500 may further comprise a display output for outputting display data to a display. This may enable the client device to display data, such as acquired camera data or a data stream which is received (back) from a remote server. Such a received data stream may for example be a processed version of the data stream which is sent to the remote server.

In a specific example, the client device 500 may acquire and send a camera data stream to the remote server, which remote server may render the camera data stream and other camera data streams in a virtual environment and send a data stream representing the rendered virtual environment back to the client device 500 for display thereon.

In general, the client device 500 may be embodied by a (single) device or apparatus, e.g., a smartphone, personal computer, laptop, tablet device, gaming console, set-top box, television, monitor, projector, smart watch, smart glasses, media player, media recorder, etc. In some examples, the client device 500 may be a so-called User Equipment (UE) of a mobile telecommunication network, such as a 5G or next-gen mobile network. In some examples, the client device 500 may be embodied by a distributed system of devices, or may represent a virtual, software-based, client.

In general, each entity described in this specification may be embodied as, or in, a device or apparatus. The device or apparatus may comprise one or more (micro)processors which execute appropriate software. The processor(s) of a respective entity may be embodied by one or more of these (micro)processors. Software implementing the functionality of a respective entity may have been downloaded and/or stored in a corresponding memory or memories, e.g., in volatile memory such as RAM or in non-volatile memory such as Flash. Alternatively, the processor(s) of a respective entity may be implemented in the device or apparatus in the form of programmable logic, e.g., as a Field-Programmable Gate Array (FPGA). Any input and/or output interfaces may be implemented by respective interfaces of the device or apparatus. In general, each functional unit of a respective entity may be implemented in the form of a circuit or circuitry. A respective entity may also be implemented in a distributed manner, e.g., involving different devices or apparatus.

Figure 6:
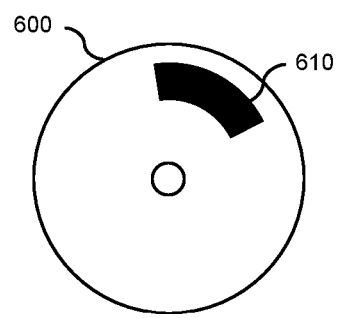
FIG. 6 shows a computer-readable medium comprising non-transitory data.

It is noted that any of the methods described in this specification, for example in any of the claims, may be implemented on a computer as a computer implemented method, as dedicated hardware, or as a combination of both. Instructions for the computer, e.g., executable code, may be stored on a computer-readable medium 600 as for example shown in FIG. 6, e.g., in the form of a series 610 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 6 shows by way of example an optical storage device 600.

In an alternative embodiment of the computer-readable medium 600, the computer-readable medium 600 may comprise transitory or non-transitory data 610 in the form of a data structure representing markers described in this specification.

Figure 7:
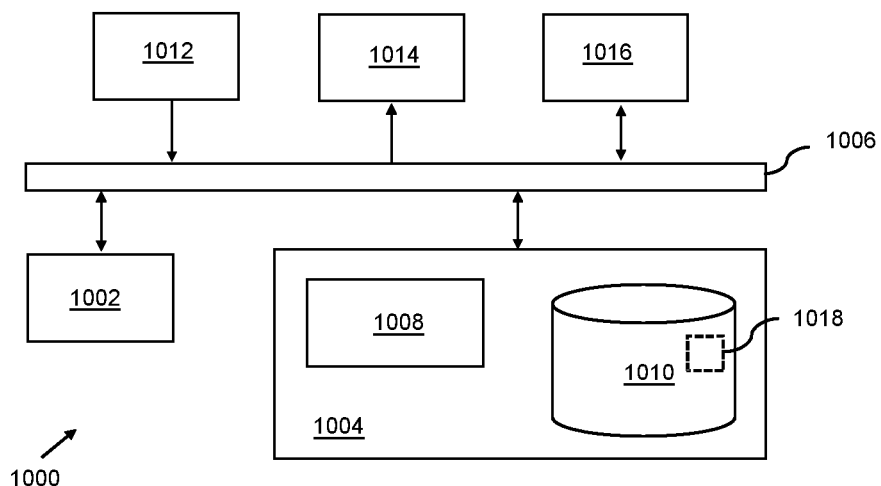
FIG. 7 shows an exemplary data processing system.

FIG. 7 is a block diagram illustrating an exemplary data processing system 1000 that may be used in the embodiments described in this specification. Such data processing systems include data processing entities described in this specification, including but not limited to the gateway system, orchestration system, remote server, and client device. The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006.

In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 7, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a gateway system as described in this specification. In that case, application 1018 may represent an application that, when executed, configures data processing system 1000 to perform the functions described with reference to the gateway system. In another example, data processing system 1000 may represent an orchestration system as described in this specification. In that case, application 1018 may represent an application that, when executed, configures data processing system 1000 to perform the functions described with reference to the orchestration system. In yet another example, data processing system 1000 may represent a remote server as described in this specification. In that case, application 1018 may represent an application that, when executed, configures data processing system 1000 to perform the functions described with reference to the remote server. Data processing system 1000 may also represent a (client) device as described in this specification. In that case, application 1018 may represent an application that, when executed, configures data processing system 1000 to perform the functions described with reference to the client device.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A gateway system for use as a gateway between a client device and a remote server, wherein the client device is configured to stream a data stream via the gateway system to the remote server for remote processing, comprising:
    a network interface for receiving the data stream and markers which identify respective blocks of packets in the data stream, wherein each identified block of packets is independently processable;
    a processor subsystem configured to, using the network interface:
        in response to an instruction or configuration to effect a migration of the remote processing from the remote server to a further remote server, determine a block of packets in the data stream from which block of packets onwards the further remote server is to start processing the data stream so as to effect or initialize the migration;
        when receiving the determined block of packets, stream the determined block of packets and subsequent blocks of packets of the data stream to the further remote server.

2. The gateway system according to claim 1, wherein the processor subsystem is configured to, when streaming the determined block of packets to the further remote server:
    cease streaming the data stream to the remote server; or
    temporarily continue to stream the data stream in duplicate to the remote server.

3. The gateway system according to claim 1, wherein the processor subsystem is configured to, in response to the instruction or configuration, already start streaming packets ahead of the determined block of packets to the further remote server to enable the further remote server to initialize its processing of the data stream.

4. The gateway system according to claim 1, wherein:
the instruction is received as an instruction message from an orchestration system configured to orchestrate the migration of the remote processing;
the processor subsystem is configured to send a response message to the orchestration system indicating that the migration is effected or initialized.

5. The gateway system according to claim 1, wherein the processor subsystem is configured to send the data stream to the further remote server by at least one of:
forwarding the packets of the data stream;
creating new packets with a network address of the further remote server;
changing a network address field in the packets received from the client device to identify the further remote server and subsequently sending said changed packets to the further remote server; and
if the packets are encapsulated packets which encapsulate data to be remotely processed and include the markers in headers of the encapsulated packets, unpacking the encapsulating packets and sending the data to be remotely processed as the data stream to the further remote server.

6. A mobile network comprising:
a first base station, and a first gateway system and a first remote server for serving client devices connected to the first base station;
a second base station, and a second gateway system and a second remote server for serving client devices connected to the second base station;
wherein the first gateway system and the second gateway system are each an instance of the gateway system according to claim 1;
wherein the first gateway system is configured to:
receive a data stream of a client device connected to the first base station and stream the data stream to the first remote server,
in response to an instruction or configuration to effect a migration of the remote processing from the first remote server to the second remote server in anticipation of the client device being handed over to the second base station, stream the data stream via the second gateway system to the second remote server;
wherein the second gateway system is configured to, after the client device is handed over to the second base station, take over the role as gateway system for the client device from the first gateway system.

7. A client device configured to stream a data stream to a remote server for remote processing, comprising:
a network interface to a network;
a processor subsystem configured to, using the network interface:
before or while streaming the data stream, generate markers for the data stream which identify respective blocks of packets in the data stream, wherein each identified block of packets is independently processable;
stream the data stream with the markers to enable a gateway receiving the data stream to determine a block of packets in the data stream from which block of packets onwards a further remote server is to start processing the data stream so as to effect or initialize a migration from the remote server to the further remote server.

8. The client device according to claim 7, wherein the processor subsystem is configured to include the markers in the data stream.

9. The client device according to claim 8, wherein the processor subsystem is configured to include a marker in each packet of the data stream, wherein the marker comprises a block identifier which identifies to which block of packets a respective packet belongs.

10. The client device according to claim 7, wherein the processor subsystem is configured to generate the markers as pseudorandom identifiers or by sequentially numbering the blocks of packets.

11. The client device according to claim 7, wherein the processor subsystem is configured to include the markers in at least one of:
a header of a transfer protocol used for the transfer of the data stream;
headers of encapsulating packets which encapsulate data to be remotely processed;
a tunnel which is established between the client device and an entity receiving the data stream, wherein the markers are included in encapsulating packets that form the tunnel.

12. An orchestration system for orchestrating a migration of remote processing of a data stream from a remote server to a further remote server, wherein the data stream is streamed by a client device to a gateway system and before the migration streamed by the gateway system to the remote server, comprising:
a network interface to a network;
a processor subsystem configured to, using the network interface:
setup the further remote server for the remote processing;
send an instruction message to the gateway system to effect or initialize a migration of the remote processing from the remote server to the further remote server by streaming the data stream to the further remote server, wherein the instruction message instructs the gateway system to determine when to start streaming the data stream to the further remote server based on markers marking the data stream, each marker identifying a respective block of packets in the data stream, each identified block of packets being independently processable.

13. The orchestration system according to claim 12, wherein the processor subsystem is configured to generate the instruction message to be indicative of a block of packets in the data stream from which block of packets onwards the gateway system is to stream the data stream to the further remote server.

14. The orchestration system according to claim 12, wherein the processor subsystem is configured to include in the instruction message at least one of:
a network address of the further remote server;
a migration type which indicates whether or not the data stream is to be temporarily continued to be streamed in duplicate to the remote server after starting to stream the data stream to the further remote server;
a migration duration which is indicative of a number of blocks of packets for which the data stream is to be temporarily continued to be streamed in duplicate to the remote server after starting to stream the data stream to the further remote server; and
information which informs the gateway system how to identify the markers in the data stream or in metadata associated with the data stream.

15. A server for processing a data stream which is streamed by a client device, comprising:

a network interface for receiving packets of the data stream;

a processor subsystem configured to, via the network interface:
  in an operating mode, process the data stream to generate an output for use by the client device or another entity, wherein the data stream comprises blocks of packets, wherein each block of packets is independently processable, wherein the processor subsystem is configured to process the data stream by at least initially independently processing the blocks of packets; and
  preceding an invocation of the operating mode, in response to an instruction or configuration indicating to initialize the processing of the data stream, start processing packets of the data stream without generating the output.

16. The server according to claim 15, wherein the server is an edge node or a system of edge nodes in a telecommunication network.

17. A computer-implemented method for providing a gateway function between a client device and a remote server, wherein the client device is configured to stream a data stream via the gateway function to the remote server for remote processing, comprising:
  receiving the data stream and markers which identify respective blocks of packets in the data stream, wherein each identified block of packets is independently processable;
  in response to an instruction or configuration to effect a migration of the remote processing from the remote server to a further remote server, determine a block of packets in the data stream from which block of packets onwards the further remote server is to start processing the data stream so as to effect or initialize the migration;
  when receiving the determined block of packets, stream the determined block of packets and subsequent blocks of packets of the data stream to the further remote server.

18. A computer-implemented method for streaming a data stream to a remote server for remote processing, comprising:
  before or while streaming the data stream, generating markers for the data stream which identify respective blocks of packets in the data stream, wherein each identified block of packets is independently processable;
  streaming the data stream with the markers to enable a gateway receiving the data stream to determine a block of packets in the data stream from which block of packets onwards a further remote server is to start processing the data stream so as to effect or initialize a migration from the remote server to the further remote server.

19. A computer-implemented method for orchestrating a migration of remote processing of a data stream from a remote server to a further remote server, wherein the data stream is streamed by a client device to a gateway system and before the migration streamed by the gateway system to the remote server, comprising:
  setting-up the further remote server for the remote processing;
  sending an instruction message to the gateway system to effect or initialize a migration of the remote processing from the remote server to the further remote server by streaming the data stream to the further remote server, wherein the instruction message instructs the gateway system to determine when to start streaming the data stream to the further remote server based on markers marking the data stream, each marker identifying a respective block of packets in the data stream, each identified block of packets being independently processable.

20. A computer-implemented method for processing a data stream which is streamed by a client device, comprising:
  receiving packets of the data stream;
  processing the data stream to generate an output for use by the client device or another entity, wherein the data stream comprises blocks of packets, wherein each block of packets is independently processable, wherein the processing comprises at least initially independently processing the blocks of packets; and
  before processing the data stream to generate the output, in response to an instruction or configuration indicating to initialize the processing of the data stream, start processing packets of the data stream without generating the output.

21. A computer-readable medium comprising non-transitory data representing a computer program, the computer program comprising instructions for causing a processor system to perform the method according to claim 17.

22. A computer-readable medium comprising non-transitory data representing a packet of a data stream and a marker, wherein the marker comprises a block identifier which identifies a block of packets to which the packet belongs, wherein the block of packets is independently processable.

* * * * *